Sept. 20, 1932.  W. HEIDINGER  1,878,697
SCALE CHART
Filed Sept. 22, 1926    2 Sheets-Sheet 1

Inventor
Willy Heidinger
by
W. M. Wilson

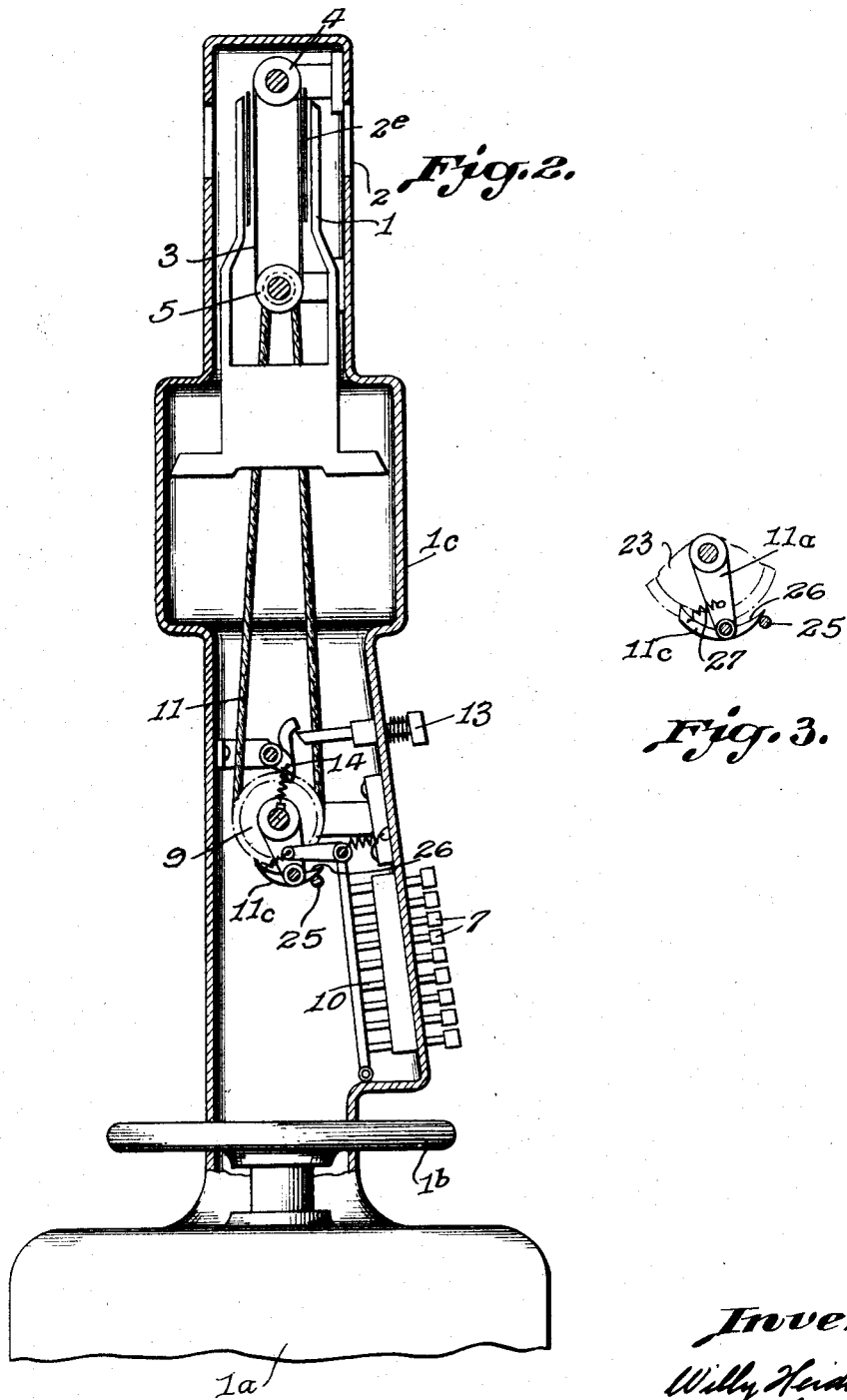

Patented Sept. 20, 1932

1,878,697

UNITED STATES PATENT OFFICE

WILLY HEIDINGER, OF BERLIN, GERMANY, ASSIGNOR TO DAYTON SCALE COMPANY, OF DAYTON, OHIO, A CORPORATION OF NEW JERSEY

SCALE CHART

Application filed September 22, 1926. Serial No. 137,070.

This invention relates to computing scales and more particularly to a chart adapted to be used in conjunction therewith.

In scales of the aforementioned type it is common practice to use fan charts of the type in which the price index moves across a number of arcuate rows of price fields which price fields are very closely spaced at the bottom of the chart and obviously limits the chart to a small number of price fields in intimate juxtaposition whereas the upper rows of price values are fairly spaced and much more legible.

A further disadvantage in the construction of the usual fan type of scale chart is that only a limited number of price fields can be used within reason due to the legibility of the scale being impaired if too many price characters be inserted thereon. Still another disadvantage is that the chart is so constructed that all the different price fields are visible to the eye at once and although auxiliary indicators or pointers be used it often happens that errors are made especially when the operator's attention is taken away during the weighing operation, as he often glances at the wrong field of prices with which the index cooperates when he resumes the weighing of the stipulated commodity.

One of the objects of my invention is to effect means whereby the aforementioned error may be eliminated, due to my chart showing but one row of price scales at a time in a single arcuate aperture in the scale.

A further object is to provide means whereby a quick and accurate adjustment of a unit price may be indicated.

A still further object is to indicate the weight and the unit price of a commodity in intimate juxtaposition cooperating with a single indicator.

Other objects of the invention will appear in the detail description of the invention which follows.

These objects and others are accomplished in the present invention by having a plurality of price scales on a chart graduated in arcuate rows according to quantity and prices of merchandise sold and also having a chart of the ordinary weighing type, which in this particular case designates grams. An indicator is adapted to cooperate with each of the above charts simultaneously. The price chart referred to is enclosed in the top of the scale casing on a pair of rollers and upon depression of a key or keys is rotated a proportional distance to the price key or keys depressed and will show the desired scale of prices in the arcuate aperture designated for same on the scale. Directly above said price scale carried by a plate mounted in the scale head is a chart used in the ordinary weighing scale for weighing purposes only.

The weighing chart on my scale as aforementioned has characters designating the weight in grams. As an illustration we will presume that a purchaser requests thirty cents worth of a commodity selling at the rate of ninety cents per thousand grams. In the present type of scale charts which have several different arcuate rows of price scales, having an indicator adapted to cooperate therewith, it would mean that the operator would have to glance at that portion of the index arm which cooperates with the appropriate row of price scales and add to the scale receptacle the desired commodity until the indicator arm cooperating with that particular row of price scales reaches the desired point. Due to the numerous price scale characters printed thereon it is obvious that errors are often made especially when the operator's attention has been drawn away for a second during the weighing operation and when the proceeds to weigh the commodity he often glances at the wrong field of price scales. With my scale chart it would simply mean depressing the ninety cent key which in turn rotates the enclosed chart until the proper price scale is visible through the aperture in the scale casing. As both the price and weight charts are visible to the operator and the purchaser they will both see at a glance the rate of the commodity designated at either side of the price scale. In the illustration, the designation 90 on the left hand side of the scale is separated from the price designation by a heavy line and is thus readily distinguished. For convenience the rate may be indicated at both ends or sides of the chart as illustrated. The prices are indicated upon the chart between the rate indications and are properly spaced so as to cooperate with the indicator arm to indicate the price and the quantity of the commodity simultaneously. It is obvious with this type of scale wherein a single row of price scales are shown that errors are not so frequently made as in the fan shaped chart wherein the price scales are all visible at one time. If by chance the operator's attention is called away after he has started the weighing procedure immediately upon his return to the scale he will notice that the commodity wanted retails at the price of ninety cents for one thousand grams and as his customer requested only thirty cents worth he would simply add the desired commodity onto the scale until the indicator registered at the three hundred and thirty-three gram mark on the weight scale and at the thirty cent mark on the price scale simultaneously. After the purchase has been completed the operator pushes a clearing key and the price scale chart automatically returns to its normal position. The accompanying drawings illustrate the preferred form of my invention.

Fig. 2 is a side elevation mostly in section taken approximately on line 2—2.

Fig. 3 is a detail of the chart actuating mechanism.

Figure 1:
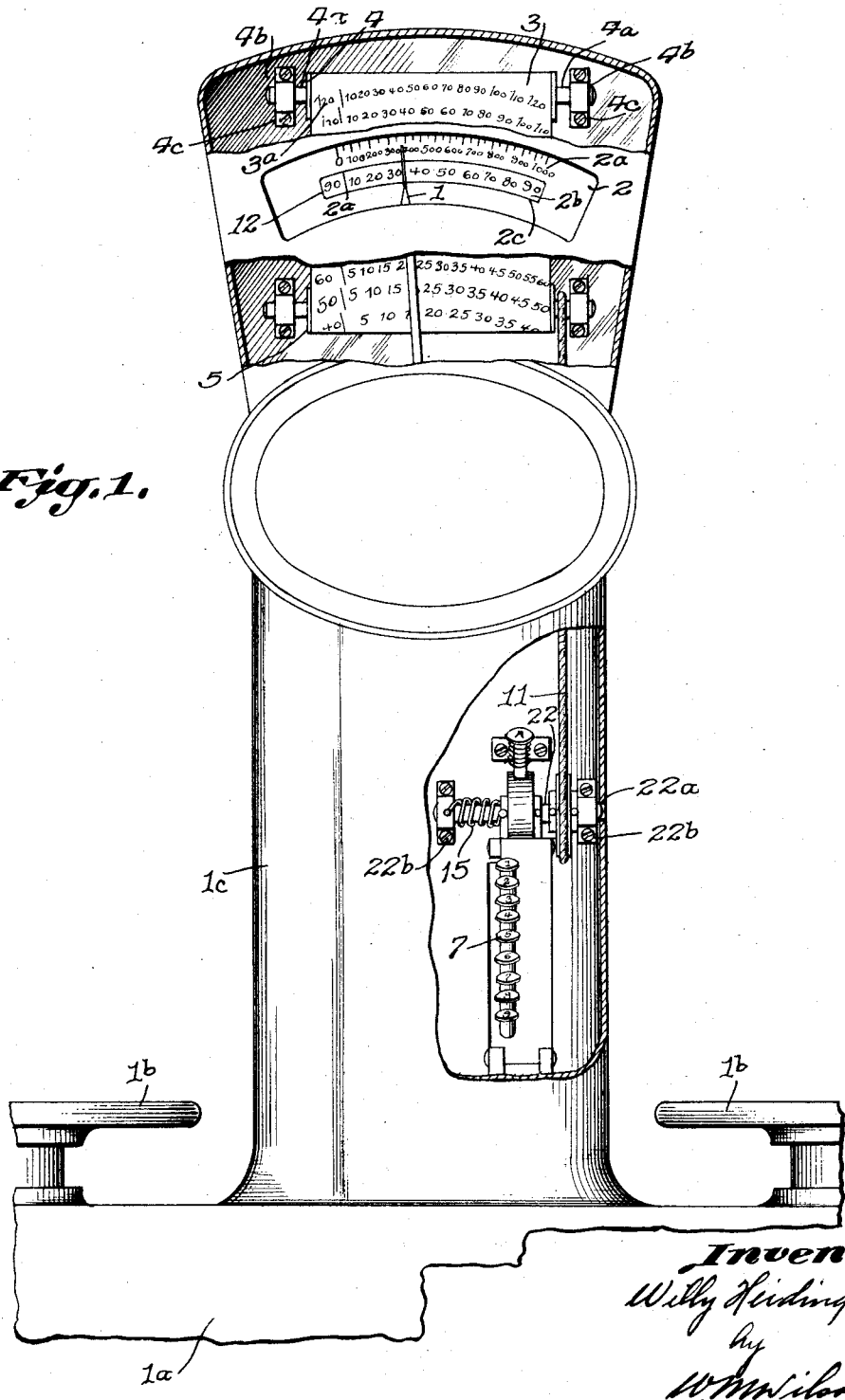
Fig. 1 is a front view of a scale partly broken away showing the chart and the key arrangement.

Referring more particularly to the drawings, Fig. 1 represents a scale of any well known construction comprising a base 1a which has mounted thereon at each end weighing receptacles 1b. Rigidly affixed to base 1a is scale casing 1c. An indicator arm or pointer 1 is adapted to traverse weight chart 2a and price scale chart 2b simultaneously. The weight chart 2a is carried by a plate 2 mounted in back of windows 2e (see Fig. 2) which plate is also provided with an arcuate aperture 2c through which the price scales may be easily and accurately read. This arcuate aperture also provides for the reading of the rate price 12 which may be separated from the total prices by means of a heavy vertical line 2d. A chart 3 is enclosed in the head of the scale casing 1c and has inserted thereon at the right and left hand sides the rates prices 12 of different commodities as shown at 3a. Between the rate designation and forming arcuate rows across the chart 3 are price scales 2b based upon the said rate. The calibration marks shown as part of the weight scale may also serve in connection with the price scales as illustrated. It is obvious, however, that such markings may also be placed upon the price chart in connection with each price scale, if desired. Said price chart 3 is mounted on rollers 4 and 5 having shafts 4a revolving in bearings 4b which bearings are rigidly held in position by means of brackets 4c affixed to the scale casing. Rotation of chart 3 is caused by means of a belt or chain drive 11 (see also Fig. 2) which drive has at its upper end a pulley or sprocket gear 5a, said pulley or gear being rigidly fixed to roller 5. At the lower end of drive 11 is also a pulley or sprocket gear 5b which is fixed upon shaft 22, mounted in bearings 22a which are held in place by means of brackets 22b. Mounted on shaft 22 is a ratchet wheel 23 (Fig. 2) actuated in one direction by spring 15 (Fig. 1) and in the other direction by the depression of any one of the series of keys 7. A lever 10 (Fig. 2) upon depression of one of the keys 7 rotates upon its axis 10a a distance depending upon which key is depressed. Pivoted to lever 10 at 10b is a link 10c which in turn is pivoted to crank 11a at 11b. Crank 11a is freely supported on shaft 22 and movement of the lever 10 causes fractional rotation of the crank about the shaft. An actuating pawl 11c tends to rotate said ratchet wheel 23 upon movement of said crank 11a and a retaining pawl 14 pivoted at 14c and biased by spring 14a tends to hold ratchet wheel 23 in any position against retrograde motion. A spring 14b attached to link 10c and casing 1c pulls lever 10 back into normal position when the depressed key in series 7 is released. In normal position the pawl 11c is out of engagement with ratchet wheel. This is effected in the usual and well-known manner by providing the pawl with a tail 26 which rides up on a fixed pin 25 to effect release of the pawl from the ratchet when the crank 11a is returned by spring 14b to normal position. The pin 25 acts on the tail of the pawl to cause rocking of the latter counterclockwise. When actuated by a key 7, the pawl tail 26 rides off pin 25 and permits the pawl nose to rock into engagement with the ratchet wheel under the influence of a spring 27 connected to the pawl and to the crank arm 11a. A clearing key 13 (Fig. 2) is mounted on scale casing 1c by means of a boss arrangement 13a through which it slides upon depression of same, having a rod 13b which cooperates with projection 13d which in turn lifts retaining pawl 14 out of engagement with sprocket gear 23 and permits the spring 15 (Fig. 1) to return the chart 3 to its normal or zero position. The pawl 11c being in normal position and held out of contact with ratchet wheel 23 by engagement of pin 25 with pawl tail 26 will not interfere with the return of the ratchet wheel to zero position. Clearing key 13 has a spring 13c which returns the key automatically to its normal position when the key is released.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. In a weighing scale having a movable index pointer and an enclosing housing, a movable chart having a plurality of scales thereon and means for yieldably holding the same in home position and returning it thereto when displaced, a series of keys corresponding to scales on the chart, means controlled by the keys upon actuation of any of them to bring and hold the corresponding scale into position with respect to said pointer and a releasing member having a part accessible for operation from the exterior of said housing for releasing said chart to permit it to return to home position.

2. In weighing apparatus provided with an index for scanning a chart normally urged to a home position; means for differentially actuating said chart from the home position including a ratchet wheel directly coupled to the chart and a pawl engaging the wheel for actuating the latter and releasable means engaging with the same ratchet wheel for retaining said wheel and chart in actuated position against tendency of the latter to return to the home position after the actuating means has been released.

3. In weighing apparatus provided with an index for scanning a chart normally yieldably urged to a home position, a series of manually operated keys, each for differentially controlling actuation of the chart from the home position, and means for retaining the chart in differential actuated position after the keys have been released by the operator, and a key for releasing said means to cause the chart to return to home position in readiness for another differential actuation from home position.

In testimony whereof I hereto affix my signature.

WILLY HEIDINGER.